US012573661B2

(12) United States Patent
Kim et al.

(10) Patent No.: US 12,573,661 B2
(45) Date of Patent: Mar. 10, 2026

(54) NON-AQUEOUS ELECTROLYTE SOLUTION ADDITIVE, NON-AQUEOUS ELECTROLYTE SOLUTION INCLUDING THE SAME, AND LITHIUM SECONDARY BATTERY

(71) Applicant: LG Energy Solution, Ltd., Seoul (KR)

(72) Inventors: Jung Keun Kim, Daejeon (KR); Young Min Lim, Daejeon (KR); Won Kyun Lee, Daejeon (KR); Duk Hun Jang, Daejeon (KR); Chan Woo Noh, Daejeon (KR); Chul Eun Yeom, Daejeon (KR); Jeong Ae Yoon, Daejeon (KR); Kyoung Hoon Kim, Daejeon (KR); Chul Haeng Lee, Daejeon (KR); Shul Kee Kim, Daejeon (KR); Young Cheol Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 514 days.

(21) Appl. No.: 18/021,618

(22) PCT Filed: Sep. 15, 2021

(86) PCT No.: PCT/KR2021/012598

§ 371 (c)(1),
(2) Date: Feb. 16, 2023

(87) PCT Pub. No.: WO2022/065796

PCT Pub. Date: Mar. 31, 2022

(65) Prior Publication Data

US 2023/0299348 A1 Sep. 21, 2023

(30) Foreign Application Priority Data

Sep. 28, 2020 (KR) ........................ 10-2020-0125369

(51) Int. Cl.
*H01M 10/0567* (2010.01)
*H01M 10/052* (2010.01)

(52) U.S. Cl.
CPC ..... *H01M 10/0567* (2013.01); *H01M 10/052* (2013.01); *H01M 2300/0025* (2013.01)

(58) Field of Classification Search
CPC .......................... H01M 10/0567; H01M 6/168
See application file for complete search history.

(56) References Cited

U.S. PATENT DOCUMENTS

| | | | |
|---|---|---|---|
| 2002/0128468 | A1 | 9/2002 | Buchanan et al. |
| 2004/0054164 | A1 | 3/2004 | Buchanan et al. |
| 2012/0107728 | A1 | 5/2012 | Ryu et al. |
| 2012/0130089 | A1 | 5/2012 | Kuramoto et al. |
| 2014/0093787 | A1 | 4/2014 | Abe et al. |
| 2014/0142324 | A1 | 5/2014 | Kuramoto et al. |
| 2018/0358655 | A1 | 12/2018 | Kono et al. |
| 2020/0002308 | A1 | 1/2020 | Hong |
| 2020/0388884 | A1 | 12/2020 | Kawakami |
| 2021/0313624 | A1 | 10/2021 | Morinaka et al. |
| 2022/0109191 | A1 | 4/2022 | Zheng et al. |

FOREIGN PATENT DOCUMENTS

| | | | |
|---|---|---|---|
| EP | 2704246 | A1 | 3/2014 |
| JP | 2018181656 | A | 11/2018 |
| JP | 2019106362 | A | 6/2019 |
| JP | 2020087690 | A | 6/2020 |
| KR | 101148831 | B1 | 5/2012 |
| KR | 20140031233 | A | 3/2014 |
| KR | 20150024478 | A | 3/2015 |
| KR | 101736739 | B1 | 5/2017 |
| KR | 101777474 | B1 | 9/2017 |
| KR | 20170132239 | A | 12/2017 |
| KR | 102070028 | B1 | 1/2020 |
| WO | 02055562 | A2 | 7/2002 |
| WO | 2018164130 | A1 | 9/2018 |
| WO | 2019189413 | A1 | 10/2019 |
| WO | 2020036222 | A1 | 2/2020 |
| WO | 2020140923 | A1 | 7/2020 |

OTHER PUBLICATIONS

Machine translation of WO 2018/164130 A1 (Year: 2018).*
International Search Report for PCT/KR2021/012598 mailed Jan. 5, 2022. 3 pages.
Extended European Search Report including Written Opinion for Application No. 21872825.1 dated Jun. 28, 2024, pp. 1-7.

* cited by examiner

*Primary Examiner* — Robert S Carrico
(74) *Attorney, Agent, or Firm* — Lerner David LLP

(57) ABSTRACT

The present invention relates to a non-aqueous electrolyte solution additive capable of improving lifespan characteristics of a lithium secondary battery by forming a solid-electrolyte interphase that is stable even at a high temperature and has low resistance when applied to a non-aqueous electrolyte solution, and relates to a non-aqueous electrolyte solution additive including a sultone-based compound represented by Formula I, a non-aqueous electrolyte solution including the same, and a lithium secondary battery.

9 Claims, No Drawings

NON-AQUEOUS ELECTROLYTE SOLUTION ADDITIVE, NON-AQUEOUS ELECTROLYTE SOLUTION INCLUDING THE SAME, AND LITHIUM SECONDARY BATTERY

CROSS-REFERENCE TO RELATED APPLICATIONS

This application is a national phase entry under 35 U.S.C. § 371 of International Application No. PCT/KR2021/012598, filed on Sep. 15, 2021, which claims priority from Korean Patent Application No. 10-2020-0125369, filed on Sep. 28, 2020, the disclosures of which are incorporated by reference herein.

TECHNICAL FIELD

The present invention relates to a non-aqueous electrolyte solution additive including a sultone-based compound, a non-aqueous electrolyte solution including the same, and a lithium secondary battery.

BACKGROUND ART

In recent years, in line with the development of personal IT devices and computer networks due to the advancement of the information society, and the resulting growing dependence on electric energy throughout the society, there is a demand for developing technology designed to efficiently store and utilize electric energy.

In particular, a growing interest in addressing environmental issues and realizing a sustainable, recycling-oriented society has brought with it extensive research into lithium ion batteries and electricity storage devices such as an electric double layer capacitor. The lithium secondary batteries, among battery-based technologies, have been highlighted as a battery system theoretically having the highest energy density.

In general, the lithium secondary batteries include a positive electrode formed of lithium-containing transition metal oxide, a negative electrode responsible for storing lithium, and an electrolyte serving as a medium that transfers lithium ions, and a separator. Among these components, the electrolyte is known as a component which greatly affects stability, safety, and the like of the battery, and therefore, studies have been actively conducted.

Meanwhile, upon charging and discharging of lithium secondary batteries, a positive electrode active material is structurally collapsed due to decomposition products of lithium salt contained in the electrolyte to deteriorate positive electrode performance, and when the positive electrode structure is collapsed, transition metal ions may be eluted from a positive electrode surface. The eluted transition metal ions are electro-deposited on a positive electrode or a negative electrode to increase positive electrode resistance, or degrade the negative electrode, and destroy a solid-electrolyte interphase (SEI), thereby causing additional decomposition of the electrolyte and consequently increased battery resistance and deterioration of battery life.

Such deterioration of battery performance tends to be further accelerated with an increase in potential of the positive electrode or exposure of the battery to high temperature.

Thus, there is an urgent need to work on additives that may contribute to producing a stable SEI on the electrode surface to suppress the elution of transition metal ions from the positive electrode or to prevent deterioration of the negative electrode.

DISCLOSURE OF THE INVENTION

Technical Problem

As a result of conducting various studies to solve the above tasks, an aspect of the present invention provides a non-aqueous electrolyte solution additive including a sultone-based compound as a non-aqueous electrolyte solution additive capable of forming a solid-electrolyte interphase (SEI) on an electrode surface.

In addition, another aspect of the present invention provides a non-aqueous electrolyte solution including the non-aqueous electrolyte solution additive.

Another aspect of the present invention provides a lithium secondary battery including the non-aqueous electrolyte solution.

Technical Solution

In order to solve the tasks described above, according to an aspect of the present invention, there is provided a non-aqueous electrolyte solution additive including a sultone-based compound represented by Formula I below.

[Formula I]

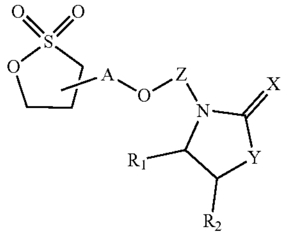

In Formula I above,

A is a single bond; or a substituted or unsubstituted linear or branched $C_1$-$C_6$ alkylene group, X is O or S, Y is O, S, or NR, in NR, R is hydrogen; a substituted or unsubstituted linear or branched $C_1$-$C_{10}$ alkyl group; a substituted or unsubstituted linear or branched $C_2$-$C_{10}$ alkenyl group; or a substituted or unsubstituted linear or branched $C_2$-$C_{10}$ alkynyl group, Z is a substituted or unsubstituted linear or branched $C_1$-$C_{10}$ alkylene group, a C═O group, an O═S═O group, a C═S group, or a S═O group, and $R_1$ and $R_2$ are each independently hydrogen; a substituted or unsubstituted linear or branched $C_1$-$C_{10}$ alkyl group; a substituted or unsubstituted linear or branched $C_2$-$C_{10}$ alkenyl group; or a substituted or unsubstituted linear or branched $C_2$-$C_{10}$ alkynyl group.

In addition, according to another aspect of the present invention, there is provided a non-aqueous electrolyte solution including an organic solvent; lithium salt; and the additive.

According to another aspect of the present invention, there is provided a lithium secondary battery including a positive electrode; a negative electrode; a separator interposed between the positive electrode and the negative electrode; and the non-aqueous electrolyte solution.

Advantageous Effects

According to the present invention, when an additive including the compound represented by Formula I is applied, a low-resistance and robust SEI layer is formed, and a lithium secondary battery having excellent high-temperature long lifespan characteristics may thus be provided.

MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terms used herein are only used to describe specific embodiments, and are not intended to limit the present invention. The singular forms are intended to include the plural forms as well, unless the context clearly indicates otherwise. As used herein, it should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Non-Aqueous Electrolyte Solution Additive

The non-aqueous electrolyte solution additive according to the present invention includes a sultone-based compound represented by Formula I below.

[Formula I]

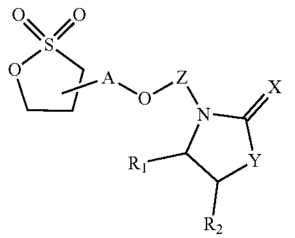

In Formula I above,

A is a single bond; or a substituted or unsubstituted linear or branched $C_1$-$C_6$ alkylene group, X is O or S, Y is O, S, or NR, in NR, R is hydrogen; a substituted or unsubstituted linear or branched $C_1$-$C_{10}$ alkyl group; a substituted or unsubstituted linear or branched $C_2$-$C_{10}$ alkenyl group; or a substituted or unsubstituted linear or branched $C_2$-$C_{10}$ alkynyl group, Z is a substituted or unsubstituted linear or branched $C_1$-$C_{10}$ alkylene group, a C═O group, an O═S═O group, a C═S group, or a S═O group, and $R_1$ and $R_2$ are each independently hydrogen; a substituted or unsubstituted linear or branched $C_1$-$C_{10}$ alkyl group; a substituted or unsubstituted linear or branched $C_2$-$C_{10}$ alkenyl group; or a substituted or unsubstituted linear or branched $C_2$-$C_{10}$ alkynyl group.

When an additive including the sultone-based compound represented by Formula I is applied, a low-resistance and robust SEI layer is formed, and a lithium secondary battery having excellent high-temperature long lifespan characteristics may thus be provided.

The sultone-based compound represented by Formula I serves as an anion receptor to induce anions to be stable in an electrolyte solution, thereby increasing ion pair separation between lithium ions and anions. In addition, the sultone-based compound represented by Formula I includes a hetero pentagonal structure containing one or more N, O, and S elements to serve to induce a stable SEI layer to be formed at an interface between an electrode and an electrolyte solution and to effectively reduce battery swelling caused by electrolyte solution decomposition at a high temperature.

In NR, R may be hydrogen; a substituted or unsubstituted linear or branched $C_1$-$C_6$ alkyl group; a substituted or unsubstituted linear or branched $C_2$-$C_6$ alkenyl group; or a substituted or unsubstituted linear or branched $C_2$-$C_6$ alkynyl group. In this case, the number of carbons is small to cause low resistance, and accordingly, in a lithium secondary battery using a non-aqueous electrolyte solution including an additive containing a compound represented by Formula I, a low resistance and robust SEI layer may be formed.

$R_1$ and $R_2$ above may each independently be hydrogen; a substituted or unsubstituted linear or branched $C_1$-$C_6$ alkyl group; a substituted or unsubstituted linear or branched $C_2$-$C_6$ alkenyl group; or a substituted or unsubstituted linear or branched $C_2$-$C_6$ alkynyl group. In this case, the number of carbons is small to cause low resistance, and accordingly, in a lithium secondary battery using a non-aqueous electrolyte solution including an additive containing a compound represented by Formula I, a low resistance and robust SEI layer may be formed.

In particular, Z above may be an O═S═O group. In this case, the compound represented by Formula I is highly ionic conductive, and accordingly, in a lithium secondary battery using a non-aqueous electrolyte solution including an additive containing the compound represented by Formula I, a low resistance SEI layer may well be formed.

According to the present invention, in regards to stability of a compound, the sultone-based compound represented by Formula I may be a compound represented by Formula 1 below. That is, in the sultone-based compound represented by Formula I, A may be a methylene group, and a substituent may be bonded to the γ-position (position next to oxygen) of the cyclic structure of sultone.

[Formula 1]

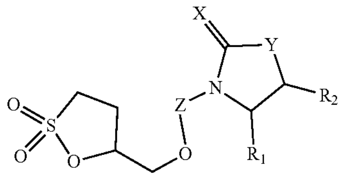

In Formula 1 above,

X is O or S,

Y is O, S, or NR, in NR above, R is hydrogen; a substituted or unsubstituted linear or branched $C_1$-$C_{10}$ alkyl group; a substituted or unsubstituted linear or branched $C_2$-$C_{10}$ alkenyl group; or a substituted or unsubstituted linear or branched $C_2$-$C_{10}$ alkynyl group, Z is a substituted or unsubstituted linear or branched $C_1$-$C_{10}$ alkylene group, a C═O group, an O═S═O group, a C═S group, or a S═O group, and $R_1$ and $R_2$ are each independently hydrogen; a substituted or unsubstituted linear or branched $C_1$-$C_{10}$ alkyl group; a substituted or unsubstituted linear or branched $C_2$-$C_{10}$ alkenyl group; or a substituted or unsubstituted linear or branched $C_2$-$C_{10}$ alkynyl group.

The sultone-based compound represented by Formula 1 has great reduction stability, and thus may promote the production of SEI materials such as $RSO_3Li$, $RSO_4Li$, $Li_2SO_3$, and $Li_2SO_4$, which are robust and have high lithium salt conductivity on the surfaces of the positive and negative electrodes. In addition, the sultone-based compound represented by Formula 1 is reduced faster than an organic solvent in an electrolyte solution to form an SEI layer, and thus may form a robust SEI layer before side reactions occur.

The reduction stability of a compound is evaluated through the following method using Gaussian 09 program package (Gaussian 09 Revision C.01, Gaussian Inc., Wallingford, CT, 2009) to which a DFT calculation method is applied. Stable structure energy of a compound before reduction ($E_{neut}$) and stable structure energy of a compound after reduction ($E_{red}$) are calculated, and then $E_{neut}$−$E_{red}$−1.45 V is defined as reduction stability. In this case, the structure stabilization calculation is performed with Polarizable Continuum Model (PCM) applied therefor.

According to the present invention, the sultone-based compound represented by Formula I is at least one selected from compounds represented by Formulas 1-1 to 1-6 below.

[Formula 1-1]

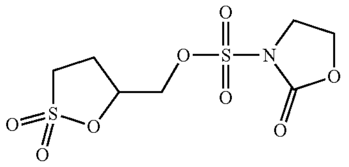

[Formula 1-2]

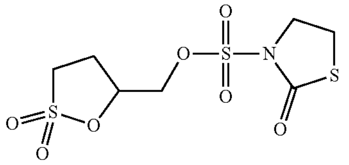

[Formula 1-3]

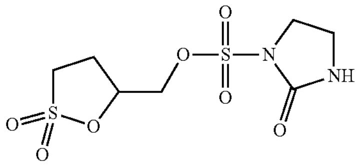

[Formula 1-4]

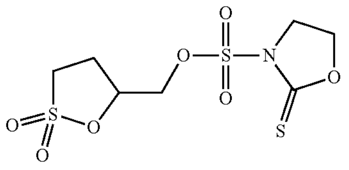

-continued

[Formula 1-5]

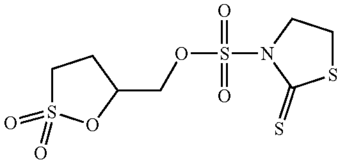

[Formula 1-6]

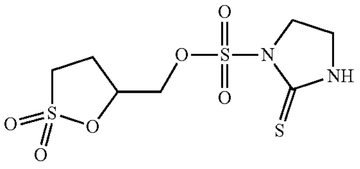

The sultone-based compound represented by Formulas 1-1 to 1-6 is redox decomposed together with an electrolyte solution on an electrode surface to produce an SEI material which is robust and has high lithium salt conductivity on the surfaces of the positive and negative electrodes, thereby contributing to improving high-temperature long lifespan characteristics.

The sultone-based compound represented by Formula I of the present invention may be prepared through: 1) sulfonation reaction of a diol-containing alkene compound or a diol-containing halogen compound; 2) reaction of forming a hydroxy group-containing sultone compound through condensation of one alcohol group in the diol and a sulfonate group; and 3) reaction of introducing a substituent having an isocyanate functional group or an isothiocynate functional group in the remaining hydroxy group, but is not limited thereto, and may be prepared through known methods. For example, a hydroxy group-containing sultone compound may be prepared through methods described in Korean Patent No. 10-1736739, Korean Patent No. 10-1777474, or International Patent WO 02/055562A2, and an isocyanate functional group or isothiocynate group is added thereto to synthesize a sultone-based compound represented by Formula I.

Non-Aqueous Electrolyte Solution

In addition, the non-aqueous electrolyte solution according to the present invention includes an organic solvent; lithium salt; and the non-aqueous electrolyte solution additive containing a sultone-based compound represented by Formula I.

The non-aqueous electrolyte solution may further include other electrolyte solution additives.

(1) Non-Aqueous Electrolyte Solution Additive Including a Sultone-Based Compound Represented by Formula I Descriptions of the sultone-based compound represented by Formula I overlaps one described above, and thus the descriptions thereof will be omitted.

Meanwhile, according to the present invention, the non-aqueous electrolyte solution additive may be included in an amount of 0.01 parts by weight to 10 parts by weight, specifically, 0.01 parts by weight to 5 parts by weight, 0.01 parts by weight to 1 part by weight, or 0.1 parts by weight to 1 part by weight, with respect to 100 parts by weight of the non-aqueous electrolyte solution. Within the above range amount of the non-aqueous electrolyte solution additive, when the non-aqueous electrolyte solution is applied to a secondary battery, the amount of an SEI layer derived from the sultone-based compound represented by Formula I is at a suitable level to enhance stability, and to prevent an increase in the internal resistance of the secondary battery, thereby preventing reduction in the capacity of the battery.

(2) Organic Solvent

The organic solvent is a non-aqueous solvent commonly used in lithium secondary batteries, and is not limited as long as it minimizes decomposition due to oxidation reaction in the charging/discharging process of secondary batteries and exhibit desired properties together with additives.

The organic solvent may be, for example, linear carbonate or cyclic carbonate, linear ester or cyclic ester, ether, glyme, nitrile (acetonitrile, SN, and the like), but is not limited thereto. Typically, as the organic solvent, a carbonate-based electrolyte solvent including a carbonate compound that is cyclic carbonate, linear carbonate, or a mixture thereof may be used.

Specific examples of the cyclic carbonate compound may include ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), but the present invention is not limited thereto.

Specific examples of the linear carbonate compound may include dimethyl carbonate (DMC), diethyl carbonate (DEC), dipropyl carbonate, ethylmethyl carbonate (EMC), methylpropyl carbonate, and ethylpropyl carbonate, but the present invention is not limited thereto.

Specific examples of the linear ester compound may include methyl acetate, ethyl acetate, propyl acetate, methyl propionate, ethyl propionate, propyl propionate, and butyl propionate, but the present invention is not limited thereto.

Specific examples of the cyclic ester compound may include γ-butyrolactone, γ-valerolactone, γ-caprolactone, (σ-valerolactone, and ε-caprolactone, but the present invention is not limited thereto.

Specific examples of the ether-based solvent may include dimethyl ether, diethyl ether, dipropyl ether, methylethyl ether, methylpropyl ether, ethylpropyl ether, 1,3-dioxolane (DOL), and 2,2-bis(trifluoromethyl)-1,3-dioxolane (TFDOL), but the present invention is not limited thereto.

The glyme-based solvent, as a solvent having higher permittivity and a lower surface tension than the linear carbonate-based organic solvent, and being less reactive with metal, includes dimethoxyethane (glyme, DME), diethoxyethane, digylme, tri-glyme, and tetra-glyme (TEGDME), but is not limited thereto.

Specific examples of the nitrile-based solvent include acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, and the like, but are not limited thereto.

Meanwhile, the cyclic carbonate-based organic solvents such as ethylene carbonate and propylene carbonate well dissociate lithium salt in an electrolyte solution due to high permittivity as a highly viscous organic solvent, and thus may be preferably used, and an electrolyte solution having high electrical conductivity may be prepared when such cyclic carbonate is mixed with the low viscosity, low permittivity linear carbonate such as dimethyl carbonate and diethyl carbonate, and ethyl methyl carbonate in an appropriate ratio, and thus the cyclic carbonate-based organic solvents may be more preferably used. In this case, the cyclic carbonate and the linear carbonate may be mixed in a volume ratio of 2:8 to 4:6 and used.

(3) Lithium Salt

The lithium salt is used as electrolyte salt in a lithium secondary battery and is used as a medium for transporting ions. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and preferably, may include $LiPF_6$, but is not limited thereto. Meanwhile, the lithium salt may be used alone or in combination, as necessary.

According to the present invention, the lithium salt may be included in a concentration range of 0.5 M to 5 M, and preferably 0.5 M to 4 M. When the concentration of the lithium salt is within the above range, the concentration of lithium ions in the electrolyte solution reaches a satisfactory level to allow battery charging and discharging to be effectively done, and the viscosity of the electrolyte solution reaches a satisfactory level to obtain excellent wetting in the battery, thereby enhancing battery performance.

(4) Other Electrolyte Solution Additives

The other electrolyte solution additives are known electrolyte solution additives that may be additionally added to the non-aqueous electrolyte solution of the present invention, and examples of the other electrolyte solution additives may include vinylene carbonate, vinyl ethylene carbonate, propane sultone, succinonitrile, adiponitrile, ethylene sulfate, propene sultone, fluoroethylene carbonate, $LiPO_2F_2$, lithium difluorooxalatoborate (LiODFB), lithium bis-(oxalato)borate (LiBOB), TMSPa(3-trimethoxysilanyl-propyl-N-aniline), TMSPi(tris(trimethylsilyl)phosphite), $LiBF_4$, or the like.

The other electrolyte solution additives may be included in an amount of 0.01 parts by weight to 10 parts by weight, preferably 0.05 parts by weight to 7.0 parts by weight, more preferably 0.05 parts by weight to 5.0 parts by weight, with respect to 100 parts by weight of the non-aqueous electrolyte solution.

Lithium Secondary Battery

In addition, a lithium secondary battery according to the present invention includes the non-aqueous electrolyte solution.

Specifically, the lithium secondary battery includes a positive electrode containing a positive electrode active material, a negative electrode containing a negative electrode active material, a separator interposed between the positive electrode and the negative electrode, and the above-described non-aqueous electrolyte solution.

In this case, the lithium secondary battery of the present invention may be manufactured according to a typical method known in the art. For example, a positive electrode, a negative electrode, and a separator between the positive electrode and the negative electrode are sequentially stacked to form an electrode assembly, and then the electrode assembly is inserted into a battery case, and the non-aqueous electrolyte solution according to the present invention may be injected to manufacture the lithium secondary battery of the present invention.

(1) Positive Electrode

The positive electrode may be prepared by coating a positive electrode current collector with a positive electrode mixture slurry including a positive electrode active material, a binder, a conductive agent, a solvent, or the like.

The positive electrode current collector is not particularly limited so long as having conductivity without causing chemical changes in the battery, and, for example, may employ stainless steel, aluminum, nickel, titanium, fired carbon, or aluminum or stainless steel that is surface-treated with carbon, nickel, titanium, silver, or the like.

The positive electrode active material is a compound capable of reversibly intercalating and deintercalating lithium, wherein the positive electrode active material may specifically include a lithium metal oxide including lithium and at least one metal such as cobalt, manganese, nickel, or aluminum. More specifically, the lithium metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), etc.), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_r2)O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included.

Among the above-listed compounds, in terms of increasing the capacity characteristics and stability of a battery, the lithium metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.7}Mn_{0.15}Co_{0.15})O_2$, $Li(Ni_{0.6}Mn_{0.2}Co_{0.2})O_2$, $Li(Ni_{0.5}Mn_{0.3}Co_{0.2})O_2$, and $Li(Ni_{0.8}Mn_{0.1}Co_{0.1})O_2$), or lithium nickel cobalt aluminum oxide (e.g., $Li(Ni_{0.8}Co_{0.15}Al_{0.05})O_2$, etc.), and in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$, and any one thereof or a mixture of two or more thereof may be used.

The positive electrode active material may be included in an amount 60 wt % to 99 wt %, preferably 70 wt % to 99 wt %, and more preferably 80 wt % to 98 wt %, with respect to the total weight of the solid content of the positive electrode mixture slurry excluding the solvent.

The binder is a component that assists in binding between the active material and the conductive agent, etc. and in binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene monomer, a sulfonated ethylene-propylene-diene monomer, a styrene-butadiene rubber, a fluorine rubber, various copolymers, and the like.

Typically, the binder may be included in an amount of 1 wt % to 20 wt %, preferably 1 wt % to 15 wt %, and more preferably 1 to 10 wt %, with respect to the total weight of the solid content of the positive electrode mixture slurry excluding the solvent.

The conductive agent is a component for further improving conductivity of the positive electrode active material.

Any conductive agent, so long as having a conductivity without causing chemical changes in the battery, may be used without particular limitation, and may employ, for example, a conductive material, such as: graphite; carbon-based materials such as carbon black, acetylene black, Ketjen black, channel black, furnace black, lamp black, or thermal black; conductive fibers such as carbon fibers or metal fibers; metal powder such as carbon fluoride powder, aluminum powder, and nickel powder; conductive whiskers such as zinc oxide whiskers and potassium titanate whiskers; conductive metal oxide such as titanium oxide; or polyphenylene derivatives.

The conductive agent may be commonly included in an amount of 1 wt % to 20 wt %, preferably 1 wt % to 15 wt %, and more preferably 1 wt % to 10 wt %, with respect to the total weight of the solid content of the positive electrode mixture slurry excluding the solvent.

The solvent may include an organic solvent such as N-methyl-2-pyrrolidone (NMP), and may be used in an amount such that a desirable viscosity is obtained when the positive electrode active material, and optional binder and the conductive agent are included. For example, the solvent may be included such that the concentration of the solid content, which includes the positive electrode active material, and optionally the binder and the conductive agent may be 50 wt % to 95 wt %, preferably 70 wt % to 95 wt %, and more preferably 70 wt % to 90 wt %.

(2) Negative Electrode

The negative electrode may be produced by coating a negative electrode current collector with a negative electrode mixture slurry including a negative electrode active material, a binder, a conductive agent, and a solvent electrode current collector, or may use a carbon (C) electrode or a metal itself as a negative electrode.

For example, the negative electrode current collector is coated with the negative electrode mixture slurry, and the negative electrode current collector generally has a thickness of 3 μm to 500 μm. The negative electrode current collector is not particularly limited as long as it has a high conductivity without causing chemical changes in the battery, and may use, for example, copper, stainless steel, aluminum, nickel, titanium, fired carbon, copper or stainless steel which is surface-treated with carbon, nickel, titanium, silver, or the like, an aluminum-cadmium alloy, or the like. In addition, as in the positive electrode current collector, the negative electrode current collector may have fine irregularities on the surface thereof to improve the bonding strength of a negative electrode active material, and the negative electrode current collector may be used in various shapes such as a film, a sheet, a foil, a net, a porous body, a foam body, and a nonwoven fabric body.

The negative electrode active material may be, for example, one kind or at least two kinds selected from the group consisting of natural graphite, artificial graphite, a carbonaceous material; a lithium-containing titanium composite oxide (LTO), metals (Me):Si, SiOx, Sn, Li, Zn, Mg, Cd, Ce, Ni, or Fe; an alloy of the metals (Me); an oxide (MeOx) of the metals (Me); and a complex of the metals (Me) and carbon.

The negative electrode active material may be included in an amount of 60 wt % to 99 wt %, preferably 70 wt % to 99 wt %, and more preferably 80 wt % to 98 wt %, with respect to the total weight of the solid content of the negative electrode mixture slurry excluding the solvent.

The binder is a component that assists in binding between a conductive agent, an active material, and a current collector. Examples of such binder may include polyvinylidene luoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer, a sulfonated ethylene-propylene-diene monomer, a styrene-butadiene rubber, a fluorine rubber, and various copolymers thereof, or the like.

The binder may be commonly included in an amount of 1 wt % to 20 wt %, preferably 1 wt % to 15 wt %, and more preferably 1 wt % to 10 wt %, with respect to the total weight of the solid content of the negative electrode mixture slurry excluding the solvent.

The conductive agent is a component for further improving conductivity of the negative electrode active material. Such conductive agent is not particularly limited as long as it has conductivity without causing chemical changes in the battery, and may employ, for example, a conductive agent, such as: graphite such as natural graphite and artificial graphite; carbon black such as acetylene black, Ketjen black, channel black, furnace black, lamp black, and thermal black; conductive fibers such as carbon fibers and metal fibers; metal powder such as carbon fluoride powder, aluminum powder, and nickel powder; conductive whiskers such as zinc oxide whiskers and potassium titanate whiskers; conductive metal oxide such as titanium oxide; or polyphenylene derivatives, or the like, may be used.

The conductive agent may be included in an amount of 1 wt % to 20 wt %, preferably 1 wt % to 15 wt %, and more preferably 1 wt % to 10 wt %, with respect to the total weight of the solid content of the negative electrode mixture slurry excluding the solvent.

The solvent may include water or an organic solvent such as NMP (N-methyl-2-pyrrolidone), and may be used in an amount satisfying a desirable viscosity when the negative electrode active material, and an optional binder and a conductive agent are included. For example, the solvent may be included such that the concentration of the solid content, which includes the negative electrode active material, and the optionally included binder and conductive agent, may be 50 wt % to 95 wt %, and preferably 70 wt % to 90 wt %.

When metal itself is used as the negative electrode, the negative electrode may be formed from a metal thin film itself or prepared by physically bonding, rolling, or vapor depositing the metal on the negative electrode current collector. Electro deposition or chemical vapor deposition may be used as deposition technique.

For example, the metal thin film itself or a metal formed on the negative electrode current collector through binding/rolling/depositing may include one metal or an alloy of two metals selected from the group consisting of lithium (Li), nickel (Ni), tin (Sn), copper (Cu), and indium (In).

(3) Separator

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto. Furthermore, a coated separator including a ceramic component or a polymer component may be used to secure heat resistance or mechanical strength, and the separator having a single layer or multilayer structure may be selectively used.

The outer shape of the lithium secondary battery of the present invention is not particularly limited, and thus a cylindrical shape using a can, a prismatic shape, a pouch shape, or a coin shape, may be used.

According to the present invention, there are provided a battery module including the lithium secondary battery as a unit cell and a battery pack including the same. The battery module and the battery pack include the lithium secondary battery having high capacity, high rate characteristics, and high cycle characteristics, and thus may be used as a power source for medium- to large-sized devices selected from the group consisting of an electric vehicle, a hybrid electric vehicle, a plug-in hybrid electric vehicle, and a power storage system.

Hereinafter, the present invention will be described in more detail through specific embodiments, however, Examples shown below are illustrated only for the understanding of the present invention, and the scope of the inventive concept is not limited thereto. It will be apparent to those skilled in the art that various modifications and alterations are possible within the scope and technical range of the present invention, and such modifications and alterations fall within the scope of claims included herein.

SYNTHESIS EXAMPLES

Synthesis Example 1, Preparation of Compound Represented by Formula 1-1

With a round-bottom flask placed in an ice bath, in the round-bottom flask, 33 g of dimethyl carbonate solution, 8.6 g of thionyl chloride, 6.0 g of pyridine, and 10.0 g of 5-(hydroxymethyl)-1,2-oxathiolane 2,2-dioxide were slowly added dropwise sequentially, and then the mixture was stirred at room temperature for an hour. Again, with a round-bottom flask placed in the ice bath, additionally, 6.6 g of 2-oxazolidin-2-one and 6.0 g of pyridine were slowly added dropwise, and then the mixture was stirred at room temperature for an hour. A reaction solution was extracted using water and dimethyl carbonate, and then an organic layer was distilled at reduced pressure to obtain an intermediate, (2,2-dioxido-1,2-oxathiolan-5-yl)methyl 2-oxooxazolidine-3-sulfonate.

With a round-bottom flask placed in an ice bath, in the round-bottom flask, 16.0 g of the intermediate, 200 g of a mixed solvent in which water and acetonitrile were mixed in a weight ratio of 1:1, 18.0 g of sodium periodate, and 0.15 g of ruthenium (III) chloride were added, and then the mixture was stirred in the ice bath for an hour. The obtained compound was purified by column to prepare a final compound, (2,2-dioxido-1,2-oxathiolan-5-yl)methyl 2-oxooxazolidine-3-sulfonate. That is, a compound represented by Formula 1-1 was prepared.

NMR analysis results are as follows.

$^1$H-NMR(Acetone-d): δ5.1 (1H); δ4.7(2H); δ4.5(d, 2H); δ3.5(d, 2H); δ3.1 (2H); δ2.8(1H); δ2.6(d, 1H)

Synthesis Example 2. Preparation of Compound Represented by Formula 1-2

A compound represented by Formula 1-2 was prepared in the same manner as in Synthesis Example 1, except that 6.5 g of imidazolidin-2-one was used instead of oxazolidin-2-one in Synthesis Example 1.

NMR analysis results are as follows.

$^1$H-NMR(Acetone-d): δ5.1 (1H); δ4.7(2H); δ3.5(d, 2H); δ3.1 (4H); δ2.8(1H); δ2.6(d, 1H)

Synthesis Example 3. Preparation of Compound Represented by Formula 1-3

A compound represented by Formula 1-3 was prepared in the same manner as in Synthesis Example 1, except that 7.8 g of thiazolidin-2-one was used instead of oxazolidin-2-one in Synthesis Example 1.

NMR analysis results are as follows.

$^1$H-NMR(Acetone-d): δ5.1 (1H); δ4.6(d, 2H); δ3.8(2H); δ3.5(d, 2H); δ3.2 (2H); δ2.8(1H); δ2.6(d, 1H)

Synthesis Example 4. Preparation of Compound Represented by Formula 1-4

A compound represented by Formula 1-4 was prepared in the same manner as in Synthesis Example 1, except that 7.8 g of oxazolidine-2-thione was used instead of oxazolidin-2-one in Synthesis Example 1.

NMR analysis results are as follows.

$^1$H-NMR(Acetone-d): δ5.1 (1H); δ4.5(d, 2H); δ3.9(2H); δ3.5(d, 2H); δ3.2 (2H); δ2.8(1H); δ2.6(d, 1H)

Synthesis Example 5. Preparation of Compound Represented by Formula 1-5

A compound represented by Formula 1-5 was prepared in the same manner as in Synthesis Example 1, except that 7.2 g of imidazolidine-2-thione was used instead of oxazolidin-2-one in Synthesis Example 1.

NMR analysis results are as follows.

$^1$H-NMR(Acetone-d): δ5.1 (1H); δ4.7(2H); δ3.7 (4H); δ3.5(d, 2H); δ2.8(1H); δ2.6(d, 1H)

Synthesis Example 6. Preparation of Compound Represented by Formula 1-6

A compound represented by Formula 1-6 was prepared in the same manner as in Synthesis Example 1, except that 9.0 g of thiazolidine-2-thione was used instead of oxazolidin-2-one in Synthesis Example 1.

NMR analysis results are as follows.

$^1$H-NMR(Acetone-d): δ5.1 (1H); δ4.7(2H); δ3.7(d, 2H); δ3.5(d, 2H); δ3.3 (2H); δ2.8(1H); δ2.6(d, 1H)

EXAMPLES

Example 1

(Preparation of Non-Aqueous Electrolyte Solution)

A non-aqueous electrolyte solution was prepared by adding 1 g of a compound represented by Formula 1-1 to 99 g of an organic solvent (ethylene carbonate (EC):ethyl methyl carbonate (EMC)=30:70 vol ratio) in which 1.2 M $LiPF_6$ was dissolved (see Table 1 below).

(Preparation of Coin Half-Cell)

A positive electrode slurry (solid content: 60 wt %) was prepared by adding positive electrode active material ($LiNi_{0.8}Co_{0.01}Mn_{0.1}O_2$; NCM):conductive agent (carbon black):binder (polyvinylidene fluoride) in a weight ratio of 97.5:1:1.5 to N-methyl-2-pyrrolidone (NMP) as a solvent. The positive electrode slurry was applied to one surface of a positive electrode current collector (Al thin film) having a thickness of 15 μm, and then dried and roll-pressed to prepare a positive electrode. Li metal was prepared as a negative electrode.

A porous polypropylene separator was interposed between the prepared positive electrode and the Li metal negative electrode, and then the prepared non-aqueous electrolyte solution was injected to prepare a coin half-cell.

Example 2

A lithium secondary battery was produced by preparing and injecting a non-aqueous electrolyte solution in the same manner as in Example 1, except that the compound represented by Formula 1-2 prepared in Synthesis Example 2 was used instead of the compound of Synthesis Example 1.

Example 3

A lithium secondary battery was produced by preparing and injecting a non-aqueous electrolyte solution in the same manner as in Example 1, except that the compound represented by Formula 1-3 prepared in Synthesis Example 3 was used instead of the compound of Synthesis Example 1.

Example 4

A lithium secondary battery was produced by preparing and injecting a non-aqueous electrolyte solution in the same manner as in Example 1, except that the compound represented by Formula 1-4 prepared in Synthesis Example 4 was used instead of the compound of Synthesis Example 1.

Example 5

A lithium secondary battery was produced by preparing and injecting a non-aqueous electrolyte solution in the same manner as in Example 1, except that the compound represented by Formula 1-5 prepared in Synthesis Example 5 was used instead of the compound of Synthesis Example 1.

Example 6

A lithium secondary battery was produced by preparing and injecting a non-aqueous electrolyte solution in the same manner as in Example 1, except that the compound represented by Formula 1-6 prepared in Synthesis Example 6 was used instead of the compound of Synthesis Example 1.

Comparative Example 1

A lithium secondary battery was manufactured by injecting a non-aqueous electrolyte solution in the same manner as in Example 1, except that an organic solvent (ethylene carbonate (EC):ethylmethyl carbonate (EMC)=3:7 volume ratio) in which 1.2 M $LiPF_6$ was dissolved was used as a non-aqueous electrolyte solution.

Comparative Example 2

A lithium secondary battery was produced by preparing and injecting a non-aqueous electrolyte solution in the same manner as in Example 1, except that 1,3-propane sultone was used instead of the compound of Synthesis Example 1.

EXPERIMENTAL EXAMPLES

Experimental Example 1. Battery Characteristics Evaluation After High Temperature Storage The secondary batteries prepared in Examples 1 to 6 and Comparative Examples 1 and 2 were each activated at a CC of 0.1 C, and then degas was performed.

Subsequently, each secondary battery was charged at a CC of 0.33 C up to 4.20 V under a constant current-constant voltage (CC–CV) condition at 25° C., then subjected to 0.05 C current cut-off, and discharged at a CC of 0.33 C up to 2.5 V. The above charging and discharging were set as one cycle, and 3 cycles were performed.

Thereafter, initial discharge capacity was measured using PNE-0506 charge/discharge equipment, a state of charge (SOC) was adjusted to 50%, and a pulse of 2.5 C was then applied for 10 seconds to calculate initial resistance through a difference between a voltage before the pulse application and a voltage after the pulse application.

Next, each secondary battery was recharged at a CC of 0.33 C up to a SOC of 100% and then stored at a high temperature of 60° C. for 4 weeks. In this case, CC–CV charge and discharge were performed at a CC of 0.33 C every two weeks after the high-temperature storage, and discharge capacity after high-temperature storage was then measured using PNE-0506 charge/discharge equipment.

The measured initial discharge capacity and the discharge capacity after high-temperature storage measured every two weeks were substituted into the following Equation (1) to calculate discharge capacity retention after high-temperature storage. The results thereof are presented in Table 1 below.

In addition, after measuring discharge capacity every two weeks after the high-temperature storage, resistance was calculated every two weeks after the high-temperature storage through a voltage drop obtained in a state in which each of the secondary batteries was subjected to a discharge pulse at 2.5 C for 10 seconds at a SOC of 50%, and the resistance was substituted into the following Equation (2) to calculate a resistance increase rate (%). The results thereof are presented in Table 1 below.

Discharge capacity retention (%)=(discharge capacity every two weeks after high-temperature storage/initial discharge capacity)×100 [Equation 1]

Resistance increase rate (%)={(resistance every two weeks after high-temperature storage-initial resistance)/initial resistance}×100 [Equation 2]

TABLE 1

| | After high-temperature storage | | | |
|---|---|---|---|---|
| | Discharge capacity retention (%) | | Resistance increase rate (%) | |
| | 2 weeks | 4 weeks | 2 weeks | 4 weeks |
| Example 1 | 92 | 91 | 3 | 5 |
| Example 2 | 90 | 88 | 4 | 7 |
| Example 3 | 89 | 86 | 5 | 9 |
| Example 4 | 91 | 89 | 5 | 8 |
| Example 5 | 88 | 86 | 4 | 10 |
| Example 6 | 89 | 87 | 6 | 11 |
| Comparative Example 1 | 81 | 78 | 8 | 14 |
| Comparative Example 2 | 86 | 83 | 7 | 15 |

Referring to Table 1, the lithium secondary batteries according to Examples 1 to 6 had a discharge capacity retention of 86% or greater and a resistance increase rate of 11% or less after high-temperature storage, whereas the lithium secondary battery according to Comparative Example 1 having a non-aqueous electrolyte solution without containing any additives and the lithium secondary battery according to Comparative Example 2 having PS as an additive had a discharge capacity retention of 83% or less and a resistance increase rate of 14% or greater after high-temperature storage, indicating that the lithium secondary batteries of Comparative Examples were degraded in comparison to those of Examples 1 to 6.

Experimental Example 2. Evaluation of High Temperature Cycle Characteristics The secondary batteries prepared in Examples 1 to 6 and Comparative Examples 1 and 2 were each activated at a CC of 0.1 C, and then degas was performed.

Subsequently, each secondary battery was charged at a CC of 0.33 C up to 4.20 V under a constant current-constant voltage (CC–CV) condition at 25° C., then subjected to 0.05 C current cut-off, and discharged at a CC of 0.33 C up to 2.5 V. The above charging and discharging were set as one cycle, and 3 cycles were performed, and then initial discharge capacity was measured using PNE-0506 charge/discharge equipment.

Subsequently, each secondary battery was charged at a CC of 0.33 C up to 4.20 V under a constant current-constant voltage (CC–CV) condition at 45° C., then subjected to 0.05 C current cut-off, and discharged at a CC of 0.33 C up to 2.50 V. The above charging and discharging were set as one cycle, and 50 cycles of charging and discharging were performed. Discharge capacity after 50 cycles at 45° C. was measured using PNE-0506 charge/discharge equipment (manufacturer: PNE SOLUTION Co., Ltd., 5 V, 6 A).

Discharge capacity retention (%) after 50 cycles at a high temperature was calculated by using Equation (3) below, and the results thereof are presented in Table 2 below.

Discharge capacity retention (%) after 50 cycles=(discharge capacity after 50 cycles/initial discharge capacity)×100 [Equation 3]

TABLE 2

| | Capacity retention (%) after 50 cycle |
|---|---|
| Example 1 | 95 |
| Example 2 | 93 |

TABLE 2-continued

| | Capacity retention (%) after 50 cycle |
|---|---|
| Example 3 | 94 |
| Example 4 | 93 |
| Example 5 | 92 |
| Example 6 | 92 |
| Comparative Example 1 | 86 |
| Comparative Example 2 | 89 |

Referring to Table 2, the lithium secondary batteries according to Examples 1 to 6 had a discharge capacity retention of 92% or greater after 50 cycles, whereas the lithium secondary battery according to Comparative Example 1 having a non-aqueous electrolyte without containing any additives and the lithium secondary battery according to Comparative Example 2 having PS as an additive had a discharge capacity retention of 89% or less, indicating that the lithium secondary batteries of Comparative Examples were degraded in comparison to those of Examples 1 to 6.

The invention claimed is:

1. A non-aqueous electrolyte solution additive, comprising:

a sultone-based compound represented by Formula 1:

[Formula 1]

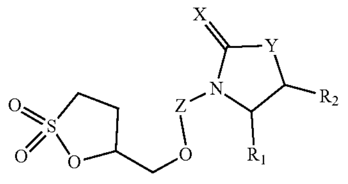

wherein in Formula 1,

X is O or S,

Y is O, S, or NR, wherein R is hydrogen, a substituted or unsubstituted linear or branched C1-C10 alkyl group, a substituted or unsubstituted linear or branched C2-C10 alkenyl group, or a substituted or unsubstituted linear or branched C2-C10 alkynyl group, Z is a substituted or unsubstituted linear or branched C1-C10 alkylene group, a C═O group, an O═S═O group, a C═S group, or a S═O group, and R1 and R2 are each independently hydrogen, a substituted or unsubstituted linear or branched C1-C10 alkyl group, a substituted or unsubstituted linear or branched $C_2$-$C_{10}$ alkenyl group, or a substituted or unsubstituted linear or branched $C_2$-$C_{10}$ alkynyl group.

2. The non-aqueous electrolyte solution additive of claim 1, wherein R is hydrogen, a substituted or unsubstituted linear or branched $C_1$-$C_6$ alkyl group, a substituted or unsubstituted linear or branched $C_2$-$C_6$ alkenyl group, or a substituted or unsubstituted linear or branched $C_2$-$C_6$ alkynyl group.

3. The non-aqueous electrolyte solution additive of claim 1, wherein $R_1$ and $R_2$ above are each independently hydrogen, a substituted or unsubstituted linear or branched $C_1$-$C_6$ alkyl group, a substituted or unsubstituted linear or branched $C_2$-$C_6$ alkenyl group, or a substituted or unsubstituted linear or branched $C_2$-$C_6$ alkynyl group.

4. The non-aqueous electrolyte solution additive of claim 1, wherein the sultone-based compound represented by Formula 1 is at least one selected from compounds represented by Formulas 1-1 to 1-6:

[Formula 1-1]

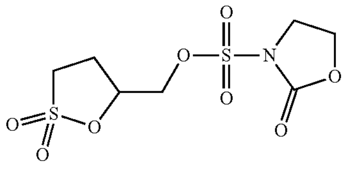

[Formula 1-2]

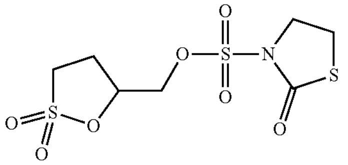

[Formula 1-3]

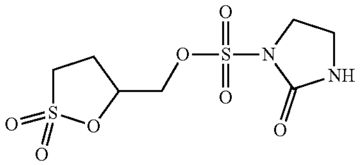

[Formula 1-4]

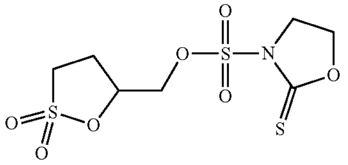

[Formula 1-5]

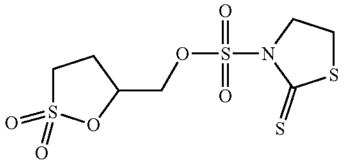

[Formula 1-6]

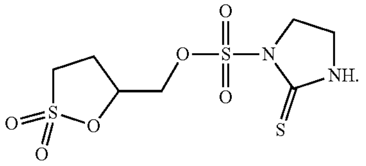

5. A non-aqueous electrolyte solution, comprising:

an organic solvent;

lithium salt; and the non-aqueous electrolyte solution additive of claim 1.

6. The non-aqueous electrolyte solution of claim 5, wherein the additive is present in an amount of 0.01 parts by weight to 10 parts by weight with respect to 100 parts by weight of the non-aqueous electrolyte solution.

7. The non-aqueous electrolyte solution of claim 5, wherein the additive is present in an amount of 0.01 parts by weight to 5 parts by weight with respect to 100 parts by weight of the non-aqueous electrolyte solution.

8. The non-aqueous electrolyte solution of claim 5, wherein the lithium salt is present in a concentration of 0.5 M to 5 M.

9. A lithium secondary battery, comprising:

a positive electrode;

a negative electrode;

a separator interposed between the positive electrode and the negative electrode; and the non-aqueous electrolyte solution of claim 5.

* * * * *